Figure 1:
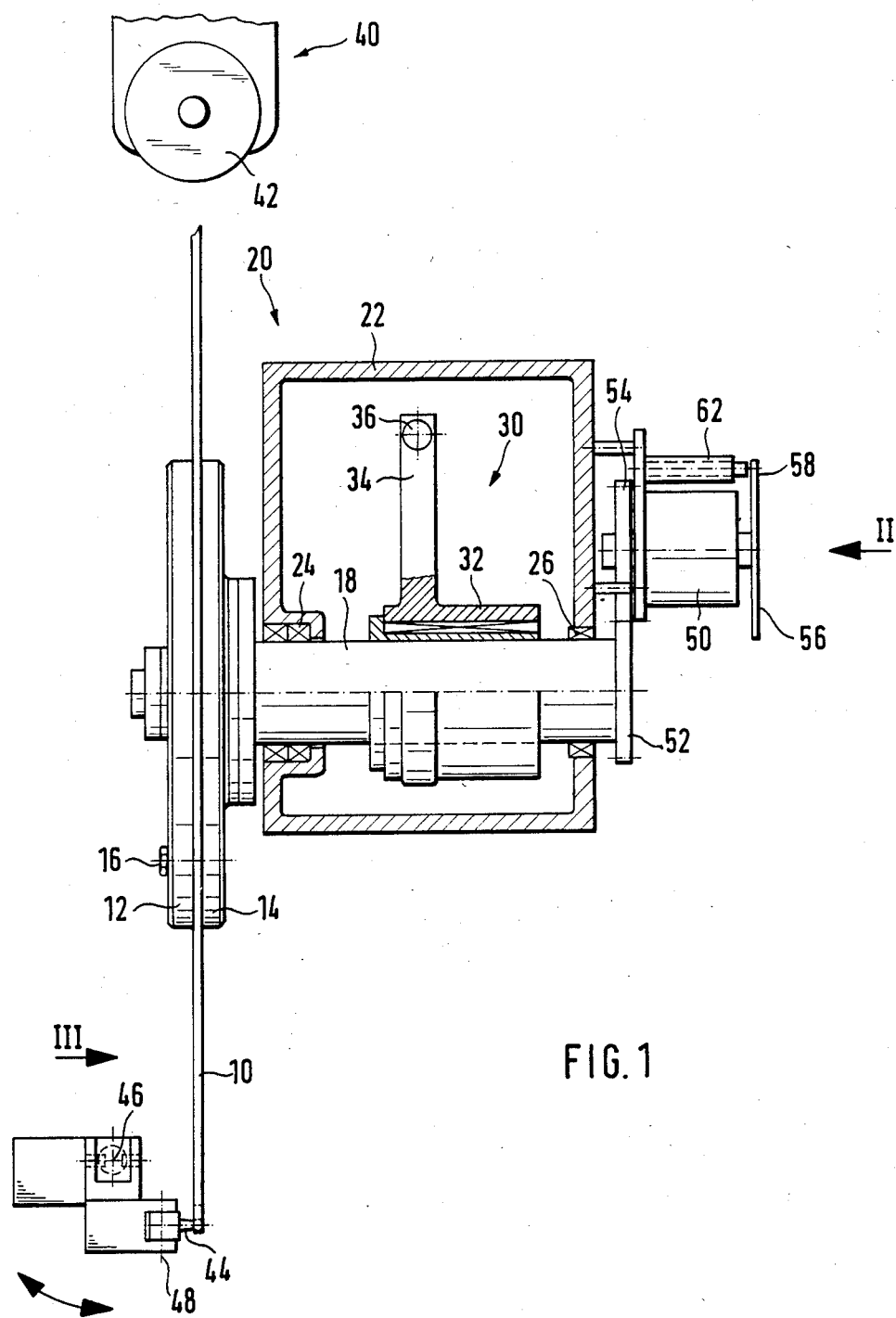

United States Patent [19]

Pokorny et al.

[11] Patent Number: 4,587,867
[45] Date of Patent: May 13, 1986

[54] CONTROL MECHANISM FOR A MACHINE FOR WORKING ON SAWS

[75] Inventors: Erich Pokorny; Norbert Bailer, both of Schemmerhofen, Fed. Rep. of Germany

[73] Assignee: Vollmer Werke Maschinenfabrik GmbH, Riss, Fed. Rep. of Germany

[21] Appl. No.: 602,517

[22] Filed: Apr. 20, 1984

[30] Foreign Application Priority Data

Apr. 22, 1983 [DE] Fed. Rep. of Germany ....... 3314601

[51] Int. Cl.$^4$ ............................................. B23D 63/08
[52] U.S. Cl. .................................................. 76/25 R
[58] Field of Search ................... 76/37, 75, 77, 40, 41, 76/42, 25 R

[56] References Cited

U.S. PATENT DOCUMENTS

| | | | |
|---|---|---|---|
| 2,855,809 | 10/1958 | Kaiser | 76/41 |
| 4,018,109 | 4/1977 | Stier | 76/77 |
| 4,357,841 | 11/1982 | Mote | 76/41 |
| 4,418,589 | 12/1983 | Cowart | 76/41 |
| 4,434,683 | 3/1984 | Kaye | 76/77 |
| 4,449,427 | 5/1984 | Beck et al. | 76/77 |

FOREIGN PATENT DOCUMENTS 126018 7/1983 Japan ........................................ 76/37

Primary Examiner—Roscoe V. Parker
Attorney, Agent, or Firm—Burns, Doane, Swecker & Mathis

[57] ABSTRACT

A machine for working on saws has a mounting (20) for a saw blade (10), an advance mechanism (30) for advancing the saw blade (10) stepwise through one or more tooth spacings, and a machining device (40) which, after each completed advance, carries out at least one working stroke on a tooth of the saw blade (10). A spacing gauge (58) on a disc (56) is connected with the saw blade (10) for common advance motion and acts together with a signaler (62) which transmits signals in response to the advance of the saw blade (10) to a control circuit (60). Said control circuit (60) permits a working stroke of the machining device (40) only when the intended advance of the saw blade (10) has taken place. Thus, the danger of the saw blade (10) being damaged as a result of an erroneous advance from the machining device (40), or of the machining device (40) itself being damaged, is avoided.

14 Claims, 4 Drawing Figures

CONTROL MECHANISM FOR A MACHINE FOR WORKING ON SAWS

The present invention relates to a control mechanism of a machine for working on saws, in particular, a sharpening machine for saws, comprising—mounting means for a saw blade,—an advance mechanism for advancing the saw blade step—wise through one or more tooth spacings,—and a machining device which, after each completed advance, carries out at least one working stroke on a tooth of the saw blade.

Within the scope of the invention, the saw blade can have the basic form of a belt, a more or less stiff, narrow plate or a circle with central opening depending on whether the saw blade is intended to be used in a frame or circular saw. Machines for working on saws on which the invention can be used apart from saw sharpening machines can, for example, be machines for stelliting saw teeth or machines for grinding plate seats on saw blades which are tipped with carbide plates.

In the described type of machines for working on saws, the advance means can have a pawl which can be moved reciprocally either rectilinearly or along a circular path, depending on the type of saw blade and which engages behind a tooth cutting edge of the saw blade before each working stroke of the machining device and advances said saw blade by one or more tooth spacings in the opposite direction to that in which it moves while sawing (DE-PS 225 859, DE-PS 30 48 738). Advance mechanisms of this type can be coupled mechanically with a lifting drive for the machining device so that this can only carry out a working stroke when the pawl of the advance mechanism has carried out a complete cycle of movement.

The advance mechanism of the described type of machine for working on saws can, however, also have a pair of feed rollers which abut a side surface of the saw blade each with a predetermined pressure and are adapted to be driven to rotate stepwise (DE-OS 24 12 939, DE-OS 27 51 648).

Finally, and above all, the invention is of significance for machines for working on saws having central advance for circular saw blades; in machines of this type, the saw blade is mounted on a shaft which is adapted to be driven to rotate stepwise. The drive for this shaft is put into action each time the machining device completes a return stroke and in doing so has, e.g., operated an electric switch. The advance of the saw blade takes place in forward direction, i.e., in its operational direction of rotation and is monitored by a biassed, tiltable probe which drops into a tooth space each time and is then taken along by the cutting edge of the next tooth to be machined into an end position in which said probe switches off the advance mechanism via an electric switch.

In all these embodiments of a machine for working on saws known in the art, the danger that the saw blade will not be taken along by the advance mechanism in the intended manner and will therefore not take up the correct position when the advance mechanism has completed its cycle of movement, cannot be ruled out. If in such a case, the machining device is still put into action, it can damage or even destroy the saw blade and, in doing so, also suffer considerable damage itself.

It is therefore an object of the present invention to develop a control mechanism of a machine of the type described at the outset for working on saws such that an erroneous advance of the saw blade remains harmless to the saw blade itself and to the machine as well.

The object is met according to the invention in
that a spacing gauge is connected to the saw blade for common advance motion,
at least one signaler is assigned to the spacing gauge for emitting signals in response to the advance of the saw blade,
and this signaler is connected to a control circuit which permits a working stroke from the machining device only when the intended advance of the saw blade has taken place.

This at any rate prevents the machining device from acting on the saw blade in any manner when and as long as the latter occupies a position in which it cannot be machined in the manner intended. The control mechanism according to the invention rules out, for example, the possibility that a grinding wheel of a saw sharpening machine should penetrate the back of a tooth instead of dipping down a cutting edge into a tooth space. It also rules out the possibility that the grinding wheel should dip unintended into the same tooth space twice and thus carry out an operation on a tooth, for instance a rough-cutting tooth, which should only be carried out in a complex grinding programme on the next tooth, for instance a finish-cutting tooth.

In the following, details are given concerning above all a digital signal evaluation; however, different embodiments of an analog signal evaluation are also possible, e.g., with a potentiometer circuit which evaluates resistance changes.

In a preferred embodiment of the control mechanism according to the invention, the control has a memory in which a number of pulses corresponding to the desired advance is storable and a comparator which compares the number of pulses coming in during a subsequent advance with the number of pulses stored. The operator thus has the possibility of simply feeding in the number of pulses required according to the tooth spacing and intended machining of the saw blade by means of a first advance monitored or manually executed by him without having to know this pulse number beforehand or even taking notice thereof subsequently. The same can also be carried out on principle with a comparison of analog signals, for instance in the form of electric voltage, which increases or is reduced proportionally to the intended or executed advance of the saw blade; however, digital monitoring has proved to be more simple and particularly reliable.

In an expedient development of the control circuit, a tolerance is connected in series with the comparator for checking a difference ascertained by the comparator between the number of pulses stored and the number of pulses newly come in to discover whether said difference is within a predetermined tolerance. This makes it possible on the one hand to use a spacing gauge sufficiently accurate for all thinkable machining cases and on the other hand, however, permits certain deviations from the prescribed advance if such deviations are harmless in view of the shape of the saw blade and the type of its machining.

It is also expedient if two signalers are assigned to the spacing gauge such that their signals occuring during an advance of the saw blade are staggered. This makes it possible to recognise errors in direction of advance which can, for instance, occur because a feed pawl catches on a projecting part of a tooth, e.g., a cutting plate, during a withdrawal movement.

The signalers can, for example, have inductive or capacitive proximity switches, Hall generators or light barriers.

If the control mechanism according to the invention is provided on a machine for working on circular saw blades, in which the mounting means for the saw blade has a shaft adapted to be secured thereto, then an expedient development of the invention is that the spacing gauge is formed on a disc connected with the shaft. The spacing gauge can then, for instance, be formed from projections or recesses in this disc or can also be attached in the form of an optically readable angular scale on the disc. Suitable spacing gauges and signalers suitable for scanning them are known in the most varied forms of embodiment and it is not necessary, therefore, that they be described in detail. The same is true of linear spacing gauges which can be used in particular when the advance of a or frame saw is to be monitored.

The embodiment described above having a disc as support for the spacing gauge is preferably developed further by connecting the disc with the shaft by a transmission gear. This makes it possible to monitor the advance of the saw blade particularly precisely without it being necessary for the disc to have a large diameter.

Figure 2:
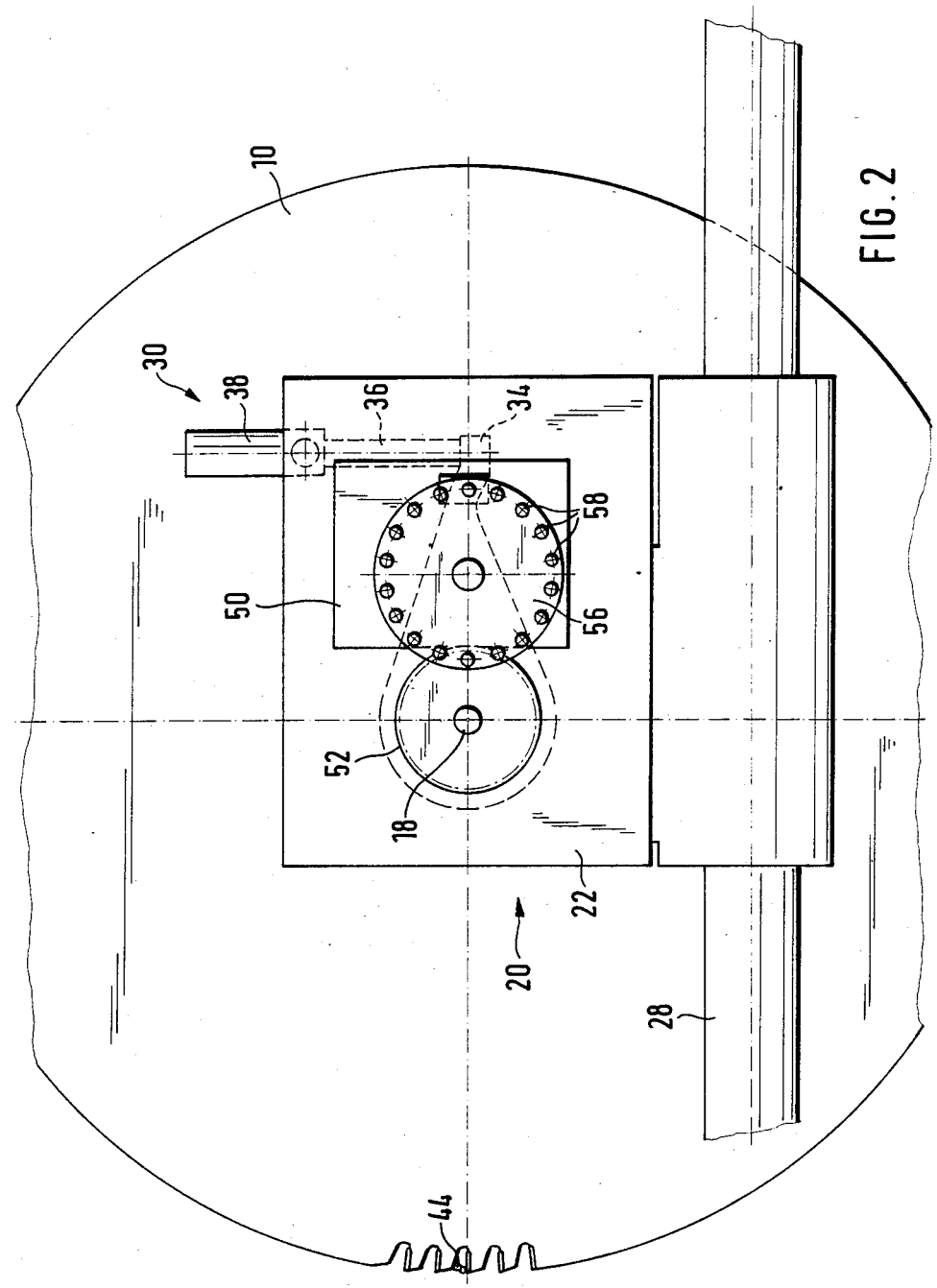
Figure 3:
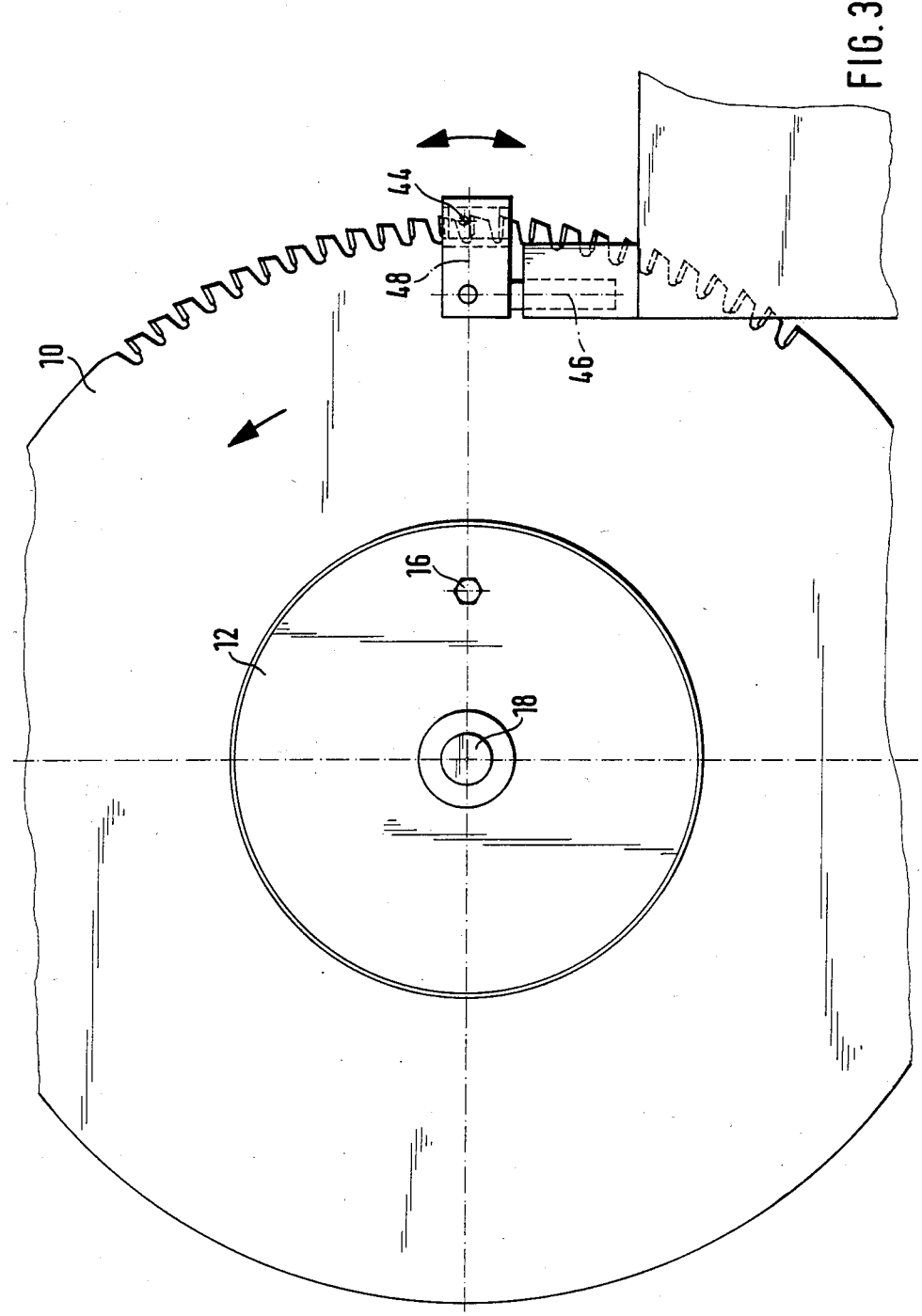
Figure 4:
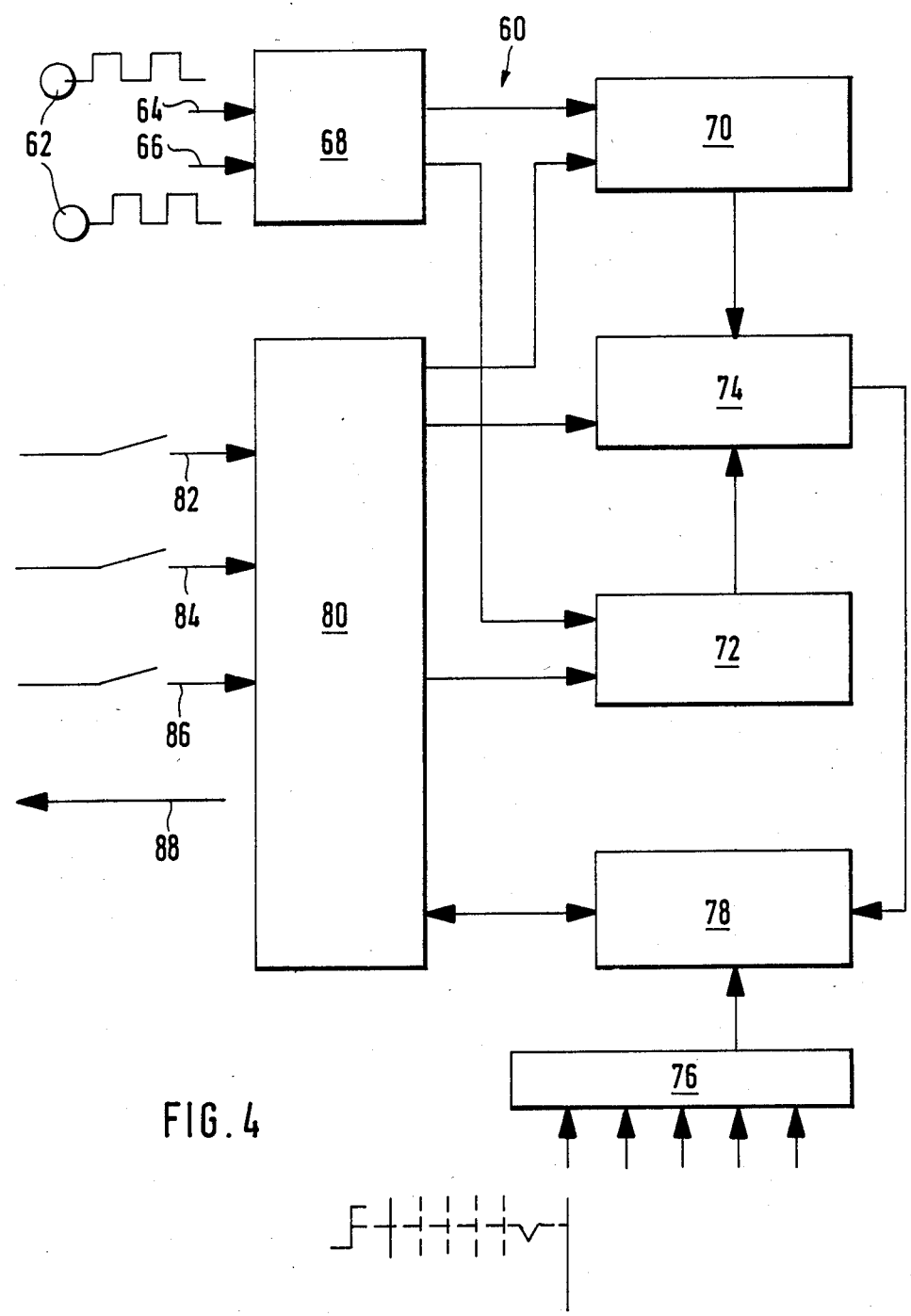

An embodiment of the invention is described below in further detail with reference to schematic drawings in which:

FIG 1 is an axial section through parts of a machine for working on saws with mounted saw blade, FIG. 2 is the view in the direction of the arrow II in FIG. 1, FIG. 3 is the view in the direction of the arrow III in FIG. 1 and FIG. 4 is a block circuit diagram of the control mechanism according to the invention.

In the illustrated example, a circular saw blade 10 is clamped between two flanges 12 and 14 and is connected to flange 14 in addition by entrainment means, e.g. a bolt 16. The two flanges 12 and 14 are attached releasably to one end of a shaft 18 which, being part of a mounting means 20 for the saw blade 10, is supported in a bearing housing 22 by means of shaft bearings 24 and 26. The bearing housing 22 is adjustable along a guide 28 in accordance with the diameter of the saw blade 10.

The shaft 18 is at the same time part of an advance mechanism 30 which serves to rotate the saw blade 10 stepwise through one or more tooth spacings. To the advance mechanism 30 belongs a freewheel 32 which connects an advance or feed lever 34 so as to be fixed in one direction of rotation and freely rotatable in the other direction with the shaft 18. A piston rod 36 is hinged to the end of the feed lever 34, said piston rod belonging to an hydraulic or pneumatic feed cylinder 38 pivotably supported on the bearing housing 22.

A machining device 40 of the saw sharpening machine having a grinding wheel 42 is also indicated. The grinding wheel 42 can be moved by strokes, each when the saw blade 10 is stationary in such a manner that on every working stroke it grinds for instance a cutting edge or a tooth back or a tooth flank of the saw blade 10.

The advance mechanism 30 is controlled by a probe 44 which is pivotable around two axes 46 and 48. Axis 46 is arranged parallel to a chord of the saw blade 10 such that the probe 44 can dip into one of the tooth spacings of the saw blade 10 during each advance movement of said saw blade 10 and thus comes into the path of motion of the subsequent cutting edge. Axis 48 extends approximately radially of the shaft 18 and the probe 44 is biassed with respect to said axis against the direction of movement of the saw blade 10 such that the probe is taken along by the cutting edge against slight resistance into an end position in which it switches off the advance mechanism 30.

In case the probe 44 should fail or the advance mechanism 30 should for another reason give the saw blade 10 too slight or too great an advance movement the control mechanism of the machine for working on saws has the additional features described below:

A transmission gear 50 is attached to the bearing housing 22 and is drivable by the shaft 18 through a gear wheel 52 attached thereto and a gear wheel 54 of equal size on the actuation shaft of the transmission gear at a ratio of 1:1. The transmission gear 50 transmits the stepwise rotational movements of the shaft 18, for example at a ratio of 1:20 to a circular disc 56 which as a result carries out twenty complete revolutions for every complete revolution of the shaft 18. On or near its outer edge, the disc 56 has a spacing gauge 58 which in the illustrated example is formed of bores arranged at equal angular distances. Two fixed signalers 62 connected to a control circuit 60 are assigned to the spacing gauge 58; in the illustrated example, these are inductive proximity switches. The ratio between the distance of the two signalers from each other to the distance between each pair of adjacent bores of the spacing gauge 58 is selected such that, on each rotation of the disc 56, the two signalers emit pulse sequences which are out of phase with each other by 180° in accordance with FIG. 4. These pulse sequences are each fed to an input 64 or 66 of an amplifier 68. In the amplifier 68, the pulses are quadrupled so that greater resolution is achieved.

The number of pulses which arrive in the amplifier 68 while the saw blade 10 is moved during a first advance by one tooth spacing is on the one hand stored in a memory 70 and on the other hand fed to a pulse counter 72. Memory 70 and pulse counter 72 are connected to a comparator 74 which on each subsequent advance compares the pulses counted by the pulse counter 72 per tooth spacing with the number of pulses stored in the memory 70 during the first advance.

The pulse numbers can deviate from each other due to unavoidable differences in tooth spacings, this however, being admissible within a tolerance range varying in size according to the type and size of the saw blade 10. For this reason, a tolerance selector 76 is provided and on this, for example, five different ranges of tolerance can be set. This tolerance selector 76 is connected to a tolerance comparator 78 to which is transmitted each time the difference ascertained by the comparator 74 between the number of pulses caused by the advance occurring at that time with the number of pulses from the first advance movement. If this difference is within the tolerance set on the tolerance selector 76, the pulse difference is ignored; the machining device carries out its next working stroke and the subsequent return stroke is followed by the next advance movement.

However, if the difference in pulse numbers ascertained by the comparator 74 and fed to the tolerance comparator 78 at the end of an advance exceeds the preselected tolerance, the tolerance comparator 78 transmits a signal to a central unit 80 which means that the advance carried out is either inadmissibly small or inadmissibly great. In this case, the central unit 80 shuts down the machine for working on saws so that the next intended work stroke from the machining device 40 does not take place and also, no further advance takes place before the fault is corrected and the central unit 80 has manually been given the appropriate instruction.

Three inputs 82, 84 and 86 are indicated at the central unit 80 for control signals "Compare", "Count" and "Reset" as well as an output 88 for the signal that shuts down the machine.

What is claimed is:

1. A control mechanism for working on saws; in particular, a sharpening machine for saws, comprising:
    means for advancing a saw blade stepwise through one or more tooth spacings of the saw blade;
    machining means for carrying out at least one working stroke on a saw blade tooth when said advancing means has completed an advance of the saw blade;
    a spacing gage connected to said bade blade and being advanced therewith by said mean for advancing;
    signal means operatively associated with said spacing gage for emitting signals in the form of pulses in response to the advance of the saw blade; and
    a control circuit means for inhibiting a working stroke of said machining means when the intended advance of the saw blade has not occurred and for permitting a working stroke when an intended advance has occurred.

2. The control mechansim according to claim 1, wherein:
    said control circuit means includes a memory means for storing pulses corresponding to a desirable advance of the saw blade; and
    a comparator means for comparing the number of pulses received by said control circuit during a subsequent advance with the number of pulses stored in said memory means.

3. The control mechanism according to claim 2, wherein:
    said control circuit further includes a tolerance comparator means connected in series with said comparator means for checking the difference between the number of pulses stored in said memory means and the numberof pulses received by said comparator means during said subsequent advance so as to ascertain whether said difference is within a predetermined tolerance.

4. The control mechanism according to claim 1, wherein:
    an additional signal means is operatively associated with said spacing gage for emitting signals in the form of pulses, the pulses emitted by said additional signal means being out of phase with the pulses emitted by said signal means.

5. The control mechanism according to claim 1, wherein said signalling means includes an inductive proximity switch.

6. The control mechanism according to claim 1, wherein said signalling means includes a capacitive proximity switch.

7. The control mechanism according to claim 1, whrein said signalling means includes a Hall generator.

8. The control mechanism according to claim 1, wherein said signalling means includes a light barrier.

9. The control mechanism according to claim 1, and further comprising:
    means for mounting said saw blade including a shaft secured to said saw blade; and
    a disc connected to said shaft, said spacing gage being formed on said disc.

10. The control mechanism according to claim 9, and further including:
    a transmission gear, said disc being connected to said shaft via said transmission gear.

11. The control mechanism according to claim 4, wherein:
    said signal means and said additional signal means each includes an inductive switch.

12. The control mechanism according to claim 4, wherein:
    said signal means and said additional signal means each includes a capacitive switch.

13. The control mechanism according to claim 4, wherein:
    said signal means and said additional signal means each includes a Hall generator.

14. The control mechanism according to claim 4, wherein:
    said signal means and said additional signal means each includes a light barrier.

* * * * *